Figure 1:
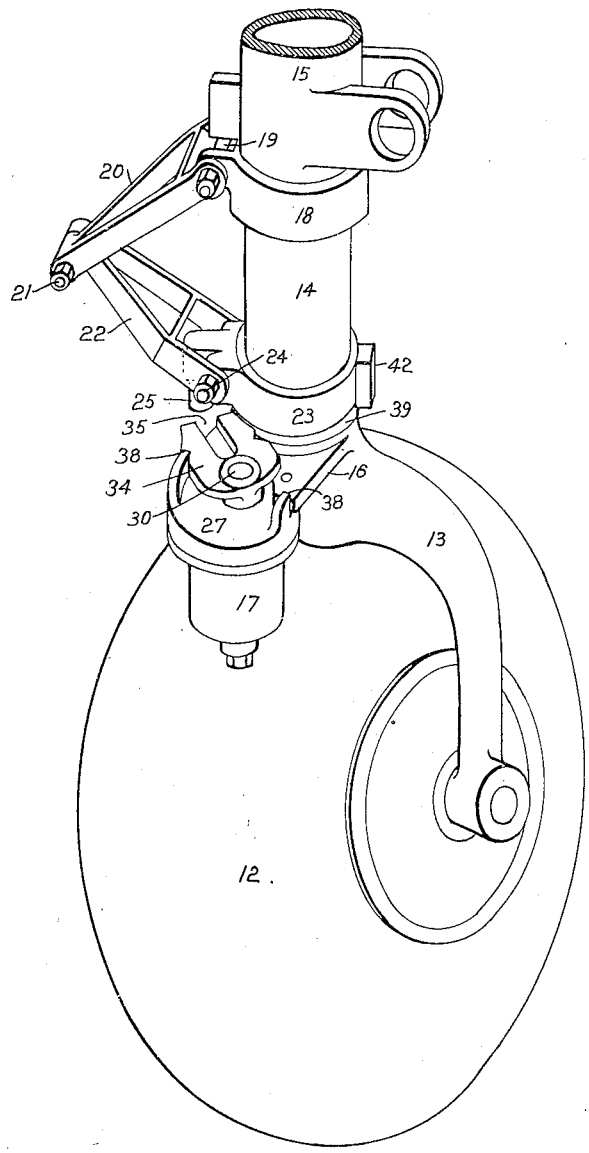

Jan. 23, 1945.  A. E. J. BISHOP  2,367,993
MEANS FOR DAMPING SWIVELING OSCILLATIONS IN CASTER WHEELS
Filed June 22, 1943  4 Sheets-Sheet 1

Inventor:—
Arthur Ernest Joseph Bishop
by his Attorneys
Howson + Howson

Jan. 23, 1945. A. E. J. BISHOP 2,367,993
MEANS FOR DAMPING SWIVELING OSCILLATIONS IN CASTER WHEELS
Filed June 22, 1943  4 Sheets-Sheet 2
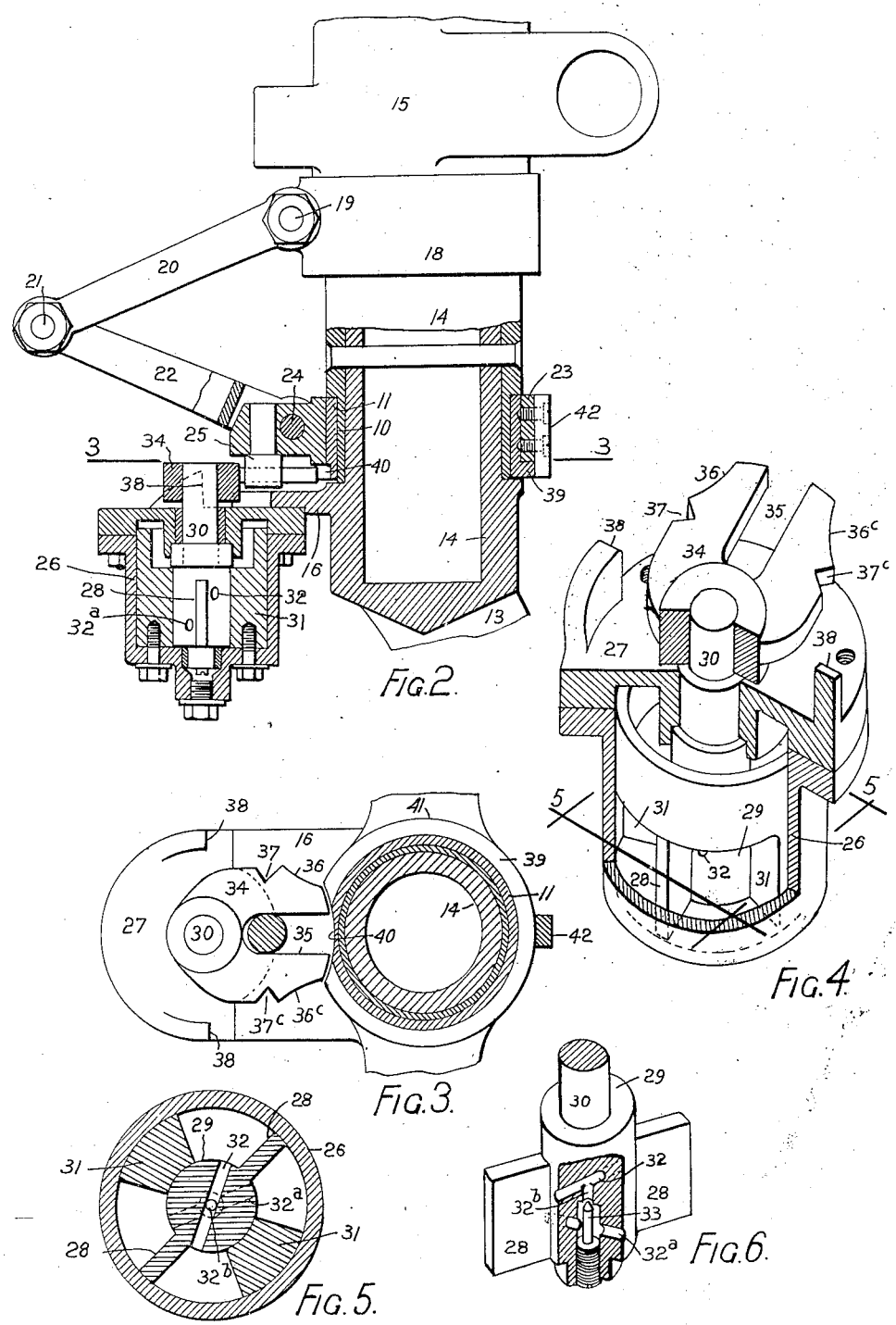
Inventor:—
Arthur Ernest Joseph Bishop
by his Attorneys
Howson & Howson

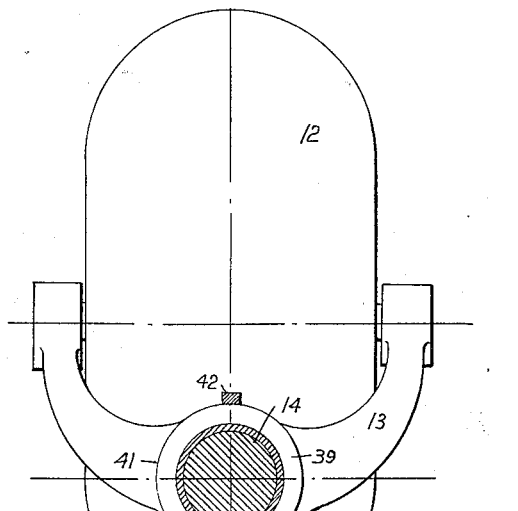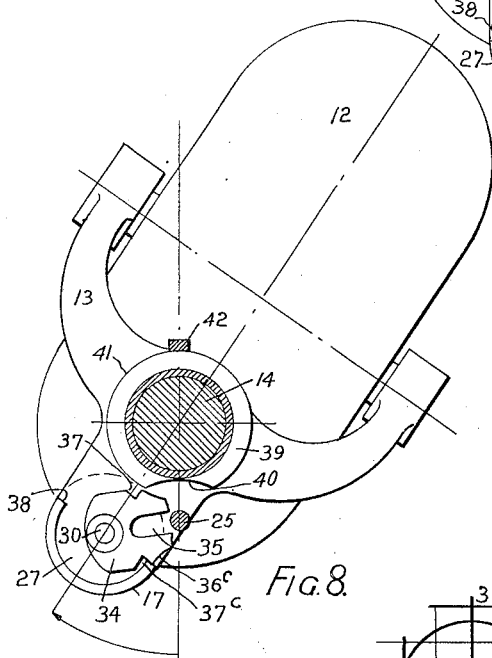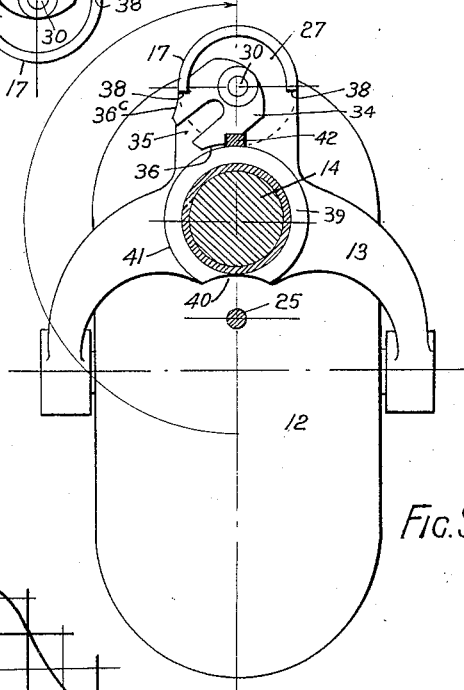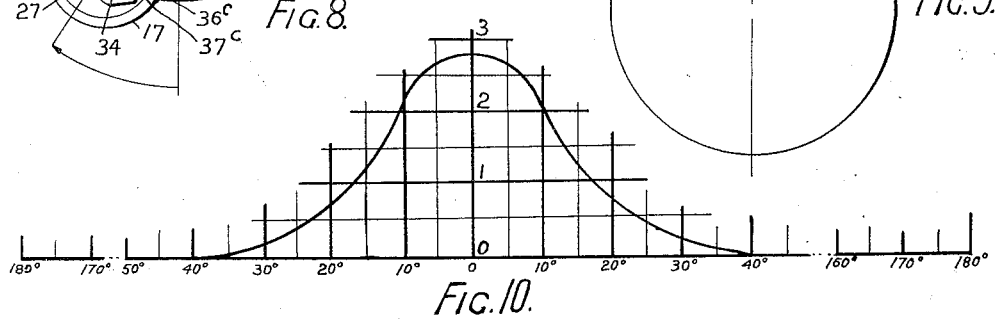

Inventor:—
Arthur Ernest Joseph Bishop
by his Attorneys
Howson + Howson

Patented Jan. 23, 1945

2,367,993

UNITED STATES PATENT OFFICE 2,367,993

MEANS FOR DAMPING SWIVELING OSCILLATIONS IN CASTER WHEELS

Arthur Ernest Joseph Bishop, Chatswood, near Sydney, New South Wales, Australia

Application June 22, 1943, Serial No. 491,854
In Australia July 29, 1942

8 Claims. (Cl. 16—35)

This invention has been devised to provide means for damping swiveling oscillations or wobble in caster wheels without restricting normal turning movement of the caster wheel stock on its axis or pivot and without restricting a complete reverse movement of the caster wheel stock. It is adaptable to any caster wheel subject to swiveling oscillations or wobble about the caster stock pivot. Specifically the invention is for the caster wheels of aircraft and it is applicable to such caster wheels having the stocks mounted in fixed or retractable supports including those supports incorporating caster wheel recoil mechanism.

These swiveling oscillations (known as "shimmy") frequently develop in the nose and/or tail caster wheels of aircraft during taxi-ing as in take-offs and landings. The oscillations start after a slight deflection of the caster wheel, which may be due to irregularities in the tarmac surface or slight changes of course or to other causes, and once started the oscillation generally increases in amplitude to such a degree that the caster wheel loses its designed effectiveness.

Known damping means for the purpose specified are not completely satisfactory; in one construction they place a limit on the turning movement of the caster wheel on its stock pivot with a consequent loss of manoeuvrability of the aircraft supported by such caster wheel or wheels during taxi-ing. When the aircraft is turned beyond the turning limit of the caster wheel's stock pivot as restricted by these known damping means the stress placed on the caster wheel is transmitted through the caster wheel support to the fuselage and may damage the structure. In another construction a frictional restriction is placed upon the turning movement of the caster wheel stock in its bearing which makes manoeuvring of the aircraft so equipped somewhat difficut especially when turning about one main wheel.

These several disadvantages are avoided in the present invention which effectively obstructs the starting of a shimmy oscillation. A further feature of the invention is that it provides for a maximum damping action on the caster wheel when it is at and near the straight ahead or "in line" position that is where the damping action is actually required and a gradually reducing damping action as the turning movement of the caster wheel on its stock pivot is increased until a determined turning angle is reached when the damping action ceases altogether.

According to this invention the caster wheel stock or alternatively the journal bearing casing therefore has affixed thereto a rotary dashpot having a radial arm; the axis of the dashpot being parallel to the axis of the caster wheel stock and the rotary movement of the arm being limited by stops on the dashpot. There is a radial open ended slot in the said arm and the sides of the arm at the end thereof have concavities therein. A structure which, when the dashpot is affixed to the caster wheel stock, is nonrotatably affixed to the journal bearing casing has a crank-like pin thereon adapted to take in the radial arm slot. When the dashpot is affixed to the caster wheel stock journal bearing casing and is therefore nonrotatable with the caster wheel stock the said structure having the crank pin thereon is associated with and rotates with the caster wheel stock. A keeper ring mounted on and rotatable with the caster wheel stock or, in the alternative construction, fixed against rotation with the caster wheel stock is placed in juxtaposition to the radial arm. This keeper ring has a concave recess in the periphery thereof providing a clearance between it and the arm when the caster wheel is in and near the in-line position. A stop is provided to limit the rotational movement of the caster wheel stock to 180° each way from the in-line position. This stop is conveniently mounted on the keeper ring and is adapted to abut the radial arm.

The described mechanism applies the damping action of the dashpot to the caster wheel throughout the movement of the crank pin in the radial arm slot which for most practical purposes is fixed at approximately 30° on each side of the line of forward movement of the caster wheel. The maximum damping action is throughout a small angle on either side of the in-line position of the caster wheel. The damping action gradually diminishes as the turning movement of the caster wheel stock increases. When the limit angle is exceeded the crank pin slides free of the radial arm slot and the movement of the caster wheel beyond said angle is unrestricted except for the rotational limit stop. As the crank pin leaves the mentioned slot the radial arm travels clear of the concave recess in the keeper ring; the peripheral edge of said ring then abuts the adjacent concavity in the radial arm and so holds said arm in position against one of the stops on the dashpot for the crank pin to re-enter the said slot on the return movement of the caster wheel. The rotational limit stop assures that the return movement of the caster wheel shall be in the direction in which the radial arm is held.

Figures 11, 12:
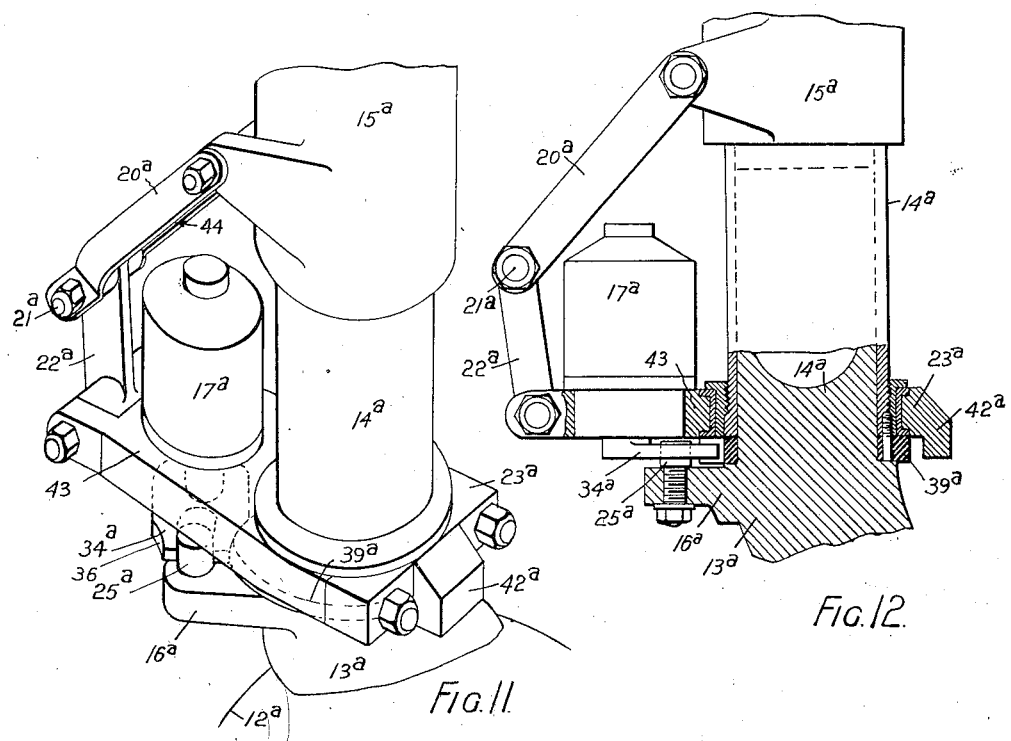
Figures 13, 14:
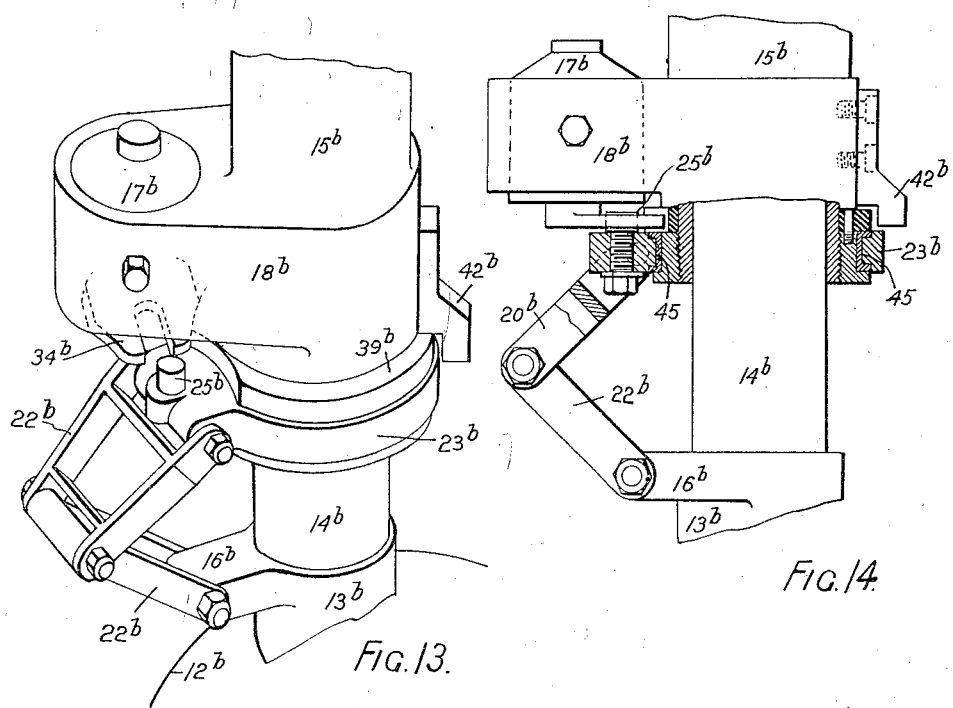

The invention will be described with reference to the annexed drawings wherein Fig. 1 is a perspective view of a caster wheel having a recoil movement associated with its stock and incorporating one embodiment of the invention; Fig. 2 is a sectional elevation of the dashpot and associated parts; Fig. 3 is a sectional plan on line 3—3 of Fig. 2; Fig. 4 is a perspective view of a rotary dashpot partly in section adapted to this invention; Fig. 5 is a section on plane 5—5 of Fig. 4; Fig. 6 is a perspective view of the dashpot piston; Figs. 7, 8 and 9 are plans showing respectively: Fig. 7 the caster wheel in straight-ahead or in-line running position, Fig. 8 the caster wheel turned on its stock pivot approximately 30° with the dashpot becoming inoperative, Fig. 9 the caster wheel completely reversed; Fig. 10 is a graph showing the effective damping angle of the dashpot; Fig. 11 is a similar view to Fig. 1 illustrating another assembly of the respective parts; Fig. 12 is an elevation partly in section of Fig. 11; Fig. 13 is another view similar to Fig. 11 showing a further assembly of the respective parts; Fig. 14 is an elevation partly in section of Fig. 13.

In the embodiment of the invention illustrated in Figs. 1, 2 and 3 the caster wheel 12 on its axle mounted in the fork 13 has its stock 14 pivotally mounted in recoil cylinder 15 which functions as a journal bearing casing therefore and which is affixed to an aircraft structure either rigidly or retractably as well understood. Bracket 16 on the fork 13 or on the base of the stock 14 carries the rotary dashpot 17 and bracket 18 on the recoil cylinder 15 has pivoted thereto by pin 19 one member 20 of a pair of links the free end of which has a pivot pin 21 supporting the other member 22 of said links and this member is pivoted to yoke 23 by pivot pin 24. The stock 14 has a reduced part forming a bearing 10 for bush 11 fixed on the yoke 23 and said stock is free to rotate in said bush. The yoke 23 is restrained from turning by the links 20—22 but at the same time the said links by movement about the respective pivots permit the yoke 23 to rise and fall with the movement of the stock 14 in the recoil cylinder 15. Yoke 23 carries the crank pin 25.

Dashpot 17 (see Figs. 4, 5 and 6) is constituted of a cylinder 26 having a cover 27 with a vane 28 on rotor 29 fixed to the shaft 30. Cylinder 26 has diametrically disposed baffles 31 therein and the rotor 29 has upper through ports 32 and lower through ports 32a connected by a vertical passage 32b; there is an adjustable valve 33 in said passage 32b. Fluid in the cylinder 26 can flow from one side of the vanes 28 to the other side on rotation of the shaft 30; the fluid passes into the ports 32 through the passage 32b, past the valve 33 thence by ports 32a to the other side of the vanes and vice versa the rate of flow of the fluid being governed by the valve 33.

Shaft 30 has radial arm 34 keyed or otherwise secured thereto and this arm 34 has a radial open ended slot 35 therein and in the outer face has two concavities 36 and 36c terminating in catch recesses 37 and 37c. These catch recesses are adapted to contact the stops 38 on the cylinder cover 27 and so limit the rotary movement of the radial arm 34.

Below the yoke 23 and formed integrally with the bush 11 is a stationary keeper ring 39 in the same plane as the radial arm 34 (see Fig. 5); this keeper ring has a concave recess 40 in the periphery thereof providing a clearance which permits the radial arm 34 to rotate through the angle of damping movement of the dashpot on the caster wheel. When the limit of this movement is reached by the caster wheel turning on its stock the crank pin 25 slides free of the slot 35 (see Fig. 8). The peripheral edge 41 of the keeper ring 39 (see Figs. 7, 8 and 9) then makes a sliding contact with the adjacent concavity 36 and 36c and so holds the arm 34 against one of the stops 38 and in position for the crank pin 25 to re-enter the slot 35 on the return movement of the caster wheel. Affixed to the yoke 23 is a stop 42.

When the caster wheel is completely reversed (see Fig. 9) stop 42 on the yoke 23 takes in the adjacent catch recess 37 or 37c and so assures that the caster wheel will return on its stock pivot through the same half circle of movement in order that the crank pin 25 will re-enter the slot 35 as stated above.

The mechanism as described above provides a maximum damping action on swiveling oscillations of the caster wheel throughout angles of approximately 5° on either side of the in-line position of the caster wheel (see Fig. 10).

This is achieved by the general arrangement of the mechanism which provides that the maximum speed of rotation of the dashpot rotor 29 is spread over such angle by having the crank pin 25 nearer to the axis of rotation of the rotor 29. When this angle of turning movement is exceeded the movement of the crank pin 25 towards the outer end of the slot 35 reduces the speed of rotation of the rotor 29 with a consequential reduction in the resistance of the dashpot to the further turning movement of the caster wheel stock on its pivot.

In the graph (Fig. 10) the ordinates marked "0" to "180" represent the turn of the caster wheel stock in degrees from the in-line position. The ordinates marked "0" to "3" show the rate of rotation of the dashpot shaft compared with that of the caster wheel stock. It will be seen that the rate of rotation of the dashpot shaft over an angle of approximately 5° on either side of the in-line position is in the order of two and three-quarter times as great as that of the caster stock over such angle. As the torque resistance of the dashpot is proportionate to the square of its rotational velocity the resulting damping resistance applied to the caster stock for an impulse of given angular velocity such as would tend to cause shimmy is of a very high order.

In the embodiment of the invention illustrated in Figs. 11 and 12 the caster wheel fork 13a has a bracket 16a on which the crank pin 25a is mounted. Yoke 23a incorporates a platform 43 and said yoke is non-rotatably held by links 20a and 22a as described with reference to Fig. 1. The yoke has the dashpot 17a mounted thereon in the reverse position to that shown in Fig. 1 with the radial arm 34a projecting below the platform 43. Keeper ring 39a is mounted on the stock 14a and rotates with it. In this construction the stop 42a is incorporated in the yoke 23a and is adapted to abut the crank pin 25a instead of the catch recess 37 or 37c said catch recess being eliminated. The stops 38 are also eliminated and reliance is placed upon the sliding contact of the keeper ring 39a with one of the concavities 36 or 36c to hold the radial arm 34a in position when the caster wheel is turned beyond the limit of damping movement. In all other respects the construction of the parts is substantially identical with Fig. 1. It will be seen that in this embodiment the relative movements of the dashpot 17a and the crank pin 25a have been reversed but the parts function as previously described. The links 20a and 22a form a protective shield for the dashpot and the link 20a has an opening 44 to clear the dashpot when the caster wheel stock 14a moves into the recoil cylinder 15a.

In the embodiment of the invention illustrated in Figs. 13 and 14 the caster wheel fork 13b has a bracket 16b to which is pivoted the link 22b. The link 20b is pivoted to yoke 23b and these links with the yoke 23b rotate with the caster wheel stock 14b instead of being nonrotatable as previously described at the same time the yoke permits the vertical movement of the stock 14b in the recoil cylinder 15b. The yoke 23b rotates in a bearing 45 associated with the recoil cylinder 15b and the yoke 23b has the crank pin 25b thereon. Bracket 18b is mounted on the recoil cylinder 15b and it houses the dashpot 17b; the radial arm 34b being located below the bracket 18b and it is of the same construction as the radial arm 34a. The keeper ring 39b is mounted on the yoke 23b. The stop 42b against which the crank pin 25b is adapted to engage is rigidly secured to the bracket 18b of the recoil cylinder 15b. All other parts are substantially identical to those previously described.

I claim:

1. Apparatus for damping oscillations of a swiveling caster wheel structure embodying a stock element rotatably mounted in a non-rotatable bearing element, a lever pivoted on one of said elements and having a radial slot formed therein, a pin secured to the other of said elements and normally operable in said slot to turn said lever upon relative rotation between said elements, and means for retarding free pivotal movement of said lever throughout a predetermined angle of operating range of said lever for damping oscillations of said stock within a predetermined angle of controlled rotation of said stock in said bearing.

2. Apparatus for damping oscillations of a swiveling caster wheel structure embodying a stock element rotatably mounted in a non-rotatable bearing element, a lever pivoted on one of said elements and having a radial slot formed therein, a pin secured to the other of said elements and normally operable in said slot to turn said lever upon relative rotation between said elements, and means for retarding free pivotal movement of said lever throughout a predetermined angle of operating range of said lever for damping oscillations of said stock within a predetermined angle of controlled rotation of said stock in said bearing, said slot having an open end remote to the pivot of said lever to afford disengagement of said pin from said lever upon relative rotation between said elements in excess of said angle of controlled rotation of said stock in said bearing.

3. Apparatus for damping oscillations of a swiveling caster wheel structure embodying a stock element rotatably mounted in a non-rotatable bearing element, a lever pivoted on one of said elements and having a radial slot formed therein, a pin secured to the other of said elements and normally operable in said slot to turn said elements, means for retarding free pivotal movement of said lever throughout a predetermined angle of operating range of said lever for damping oscillations of said stock within a predetermined angle of controlled rotation of said stock in said bearing, said slot having an open end remote to the pivot of said lever to afford disengagement of said pin from said lever upon relative rotation between said elements in excess of said angle of controlled rotation of said stock in said bearing, means for limiting said excess relative rotation between said elements, and means for retaining said lever in position at the extremes of said operating range for said pin to re-enter said slot upon reversal of the direction of relative rotation between said elements to within said predetermined angle of controlled rotation of said stock in said bearing.

4. Apparatus for damping oscillations of a swiveling caster wheel structure embodying a stock element rotatably mounted in a non-rotatable bearing element, a lever pivoted on one of said elements and having a radial slot formed therein, a pin secured to the other of said elements and normally operable in said slot to turn said lever upon relative rotation between said elements, means for limiting pivotal movement of said lever within a predetermined angle of operating range, means for retarding free pivotal movement of said lever within said angle of operating range for damping oscillations of said stock within a predetermined angle of controlled rotation of said stock in said bearing, said slot having an open end remote to the pivot of said lever to afford disengagement of said pin from said lever upon relative rotation between said elements in excess of said angle of controlled rotation of said stock in said bearing, means for limiting said excess relative rotation between said elements, and means cooperating with said lever limiting means for retaining said lever in position at the extremes of said operating range for said pin to re-enter said slot upon reversal of the direction of relative rotation between said elements to within said predetermined angle of controlled rotation of said stock in said bearing.

5. Apparatus for damping oscillations of a swiveling caster wheel structure embodying a stock element rotatably mounted in a non-rotatably bearing element, a lever pivoted on one of said elements and having a radial slot formed therein, a pin secured to the other of said elements and normally operable in said slot to turn said lever upon relative rotation between said elements, a rotary dash pot for retarding free pivotal movement of said lever throughout a predetermined angle of operating range of said lever for damping oscillations of said stock within a predetermined angle of controlled rotation of said stock in said bearing, said dash pot comprising a cylinder secured to the element on which said lever is pivoted, a rotor mounted for oscillation in said cylinder and affording the pivot for said lever, relatively movable abutments fixed inside said cylinder and on said rotor respectively for trapping retarding fluid in chambers formed by and between said relatively movable abutments, fluid escape passages affording intercommunication between said trap chambers, and means for controlling the rate of escape of fluid through said passages to regulate the intensity of retardation afforded by said dash pot.

6. Apparatus for damping oscillations of a swiveling caster wheel structure embodying a stock element rotatably mounted in a non-rotatable bearing element, a lever pivoted on a first of said elements and having a radial slot formed therein, a pin secured to a second of said elements and normally operable in said slot to turn said lever upon relative rotation between said elements, stop means on said first element engageable with said lever for limiting the pivotal movement of said lever to a predetermined angle of operating range, means for retarding free pivotal movement of said lever within said angle of operating range for damping oscillations of said stock within a predetermined angle of controlled rotation of said stock in said bearing, said slot having an open end remote to the pivot of said lever to afford disengagement of said pin from said lever upon relative rotation between said elements in excess of said angle of controlled rotation of said stock in said bearing, and means on said second element engageable with said lever to maintain said lever in contact with said limiting stock means for retaining said lever in position at the extremes of said operating range for said pin to re-enter said slot upon reversal of the direction of relative rotation between said elements to within said predetermined angle of controlled rotation of said stock in said bearing.

7. Apparatus for damping oscillations of a swiveling caster wheel structure embodying a stock element rotatably mounted in a non-rotatable bearing element, a lever pivoted on one of said elements with its pivoted axis in laterally spaced relation to the axis of rotation of said stock, a pin secured to the other of said elements and normally operable in a radial slot formed in said lever to turn said lever upon relative rotation between said elements, and means for retarding free pivotal movement of said lever about its said axis throughout a predetermined angle of operating range of said lever for damping oscillations of said stock about its said axis within a predetermined angle of controlled rotation of said stock in said bearing, said pin being normally disposed in the inner end of said slot adjacent the pivot of said lever when said lever and said stock are in normal positions midway of the total angle of operating range of said lever to afford maximum retardation to oscillation of said stock in moving out of said normal position and a gradual reduction of said retardation as said pin moves outward in said slot in accordance with the extent of further rotary movement of said stock element in said bearing element.

8. Apparatus for damping oscillations of a swiveling caster wheel structure embodying a stock element rotatably mounted in a fixed journal and an axially spaced non-rotatable bearing element, link mechanism connecting said journal and said bearing element for holding said bearing element against rotation while affording relative axial movement between said journal and said bearing element, a lever pivoted on one of said elements, a pin secured to the other of said elements and normally operable in a radial slot formed in said lever to turn said lever upon relative rotation between said elements, and means for retarding free pivotal movement of said lever throughout a predetermined angle of operating range of said lever to dampen oscillations of said stock element relative to said bearing element within a predetermined angle of rotary movement therebetween.

ARTHUR ERNEST JOSEPH BISHOP.